Oct. 22, 1940.  T. E. BOYER ET AL  2,219,064

PACKING GLAND MOUNTING

Filed May 25, 1937

Inventors
Tanner E. Boyer
and Lester P. Stockman;
By R. S. Berry
Attorney

Patented Oct. 22, 1940

2,219,064

UNITED STATES PATENT OFFICE 2,219,064

PACKING GLAND MOUNTING

Tanner E. Boyer, Bell, and Lester P. Stockman, Los Angeles, Calif.

Application May 25, 1937, Serial No. 144,664

4 Claims. (Cl. 286—15)

This invention relates to a mounting for packing glands of the character employed in packing longitudinally reciprocal pump rods in oil well pumps and the like.

An object of the invention is to provide a mounting for a packing gland which will permit transverse reciprocal movement of the gland under lateral thrusts imposed on the gland through the pump rod thereby minimizing wear of the gland packing occasioned by such thrusts, and whereby frequent shut-downs for renewing packing of the gland will be obviated thus increasing production of wells equipped with the invention over those fitted with the usual packing gland mounting construction.

Another object is to provide a construction in the gland mounting which while affording the desired lateral shifting movement of the gland, will afford a seal around the shiftable gland such as will prevent the escape of gases or liquids around the exterior of the gland.

With the foregoing objects in view, together with such other objects and advanges as may subsequently appear, the invention is carried into effect as illustrated by way of example in the accompanying drawing in which.

Figure 1:
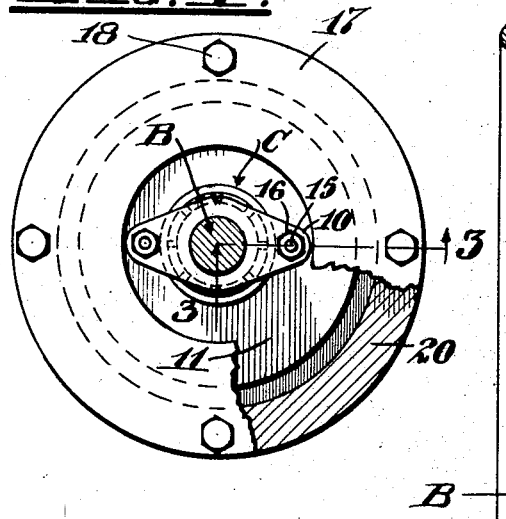
Fig. 1 is a plan view of the gland mounting with portions broken away showing it as applied.

Referring to the drawing more specifically A indicates generally the head box of a pump tubing and B denotes a reciprocal pump rod which extends through the box A into the pump tubing and is fitted in the usual manner at its lower end with a pump piston and is connected at its upper end with a walking beam as is common in oil well pump construction.

The pump rod B passes through a packing gland C which, as to the gland per se, may be of any suitable construction but is here shown as comprising the wiper packing gland set forth in the application for United States Patent of Tanner E. Boyer, Serial Number 79,043, filed May 11, 1936, Patent No. 2,126,366, dated August 9, 1938.

The gland C embodies a cylindrical housing 8 which encircles the pump rod B in spaced concentric relation thereto and the lower end of which is formed with an inwardly projecting marginal flange 9 the inner edge of which is spaced from the outer periphery of the rod B. The upper or inner face of the flange 9 is beveled and seating thereon is a combined packing and wiping element D encircling the rod B in slidable contact therewith. Seating on the element D is a crowding ring E on which seats a sleeve F mounted for vertical adjustment in the housing 8 and in which is disposed a packing element G on which bears a crowding ring H on the upper end of which bears a packing adjustment ring J formed with a flange 10.

In carrying out the present invention the cylindrical gland housing 8 is formed with a circumferentially extending continuous flange 11 having flat parallel opposed surfaces, and the box A is formed with a horizontally extending marginal flange 12 on the upper end thereof carrying a wearing ring 13 on which the flange 11 is slidably seated to afford a support for the gland C; the box A embodying a cylindrical side wall 14 the inner periphery of which is of a diameter exceeding the diameter of the housing 8, which latter projects interiorly of the box A, so as to afford requisite clearance to permit movement of the gland C radially in relation to the box.

Threaded studs 15 project upwardly from the flange 11 through openings in the flange 10 and are fitted with nuts 16 screwed on the upper ends of the studs to bear on the flange 10 for tightening the packing elements D and G of the gland C.

As a means for holding the gland against excessive upward movement relative to the box a cap ring 17 is positioned with its inner marginal portion overlying the flange 11 in loose sliding contact therewith and which ring is held in place by bolts 18 passing there-through and through the box flange 12 and fitted with nuts 19 bearing against the under side of the flange.

In the construction shown the ring 13 is coextensive with the flange 12 and is engaged by the bolt 18 in which arrangement the outer marginal portion of the ring 17, which is fitted with a down-turned flange 20, bears on shims 21 seating on the ring 13.

An important feature of the invention resides in the provision of a sealing means K for preventing the escape of gas or other fluids from interiorly of the box around the gland C. This means, as shown in Figs. 1 to 4 inclusive, embodies a substantially conical shaped elastic or pliable sleeve 22 spanning the gap between the gland housing 8 and the box side wall 14; the sleeve 22 being here shown as having a marginal flange 23 on the enlarged end thereof which seats in an annular channel 24 on the inner marginal edge of the flange 12 with the reduced end portion of the sleeve extending downwardly interiorly of the box and encircling the lower portion of the gland housing 8 which is formed with a circumferentially extending channel 25 engaged by a bead 26 formed on the inner periphery of the reduced end portion of the sleeve 22. The ring 13 bears on the flange 23 of the sleeve 22 to hold the latter in place.

The gland housing 8 is formed at its lower end with a circumferentially extending flange 27 to impact the wall 14 in event of radial movement of the gland to the limit of its stroke.

Figure 3:
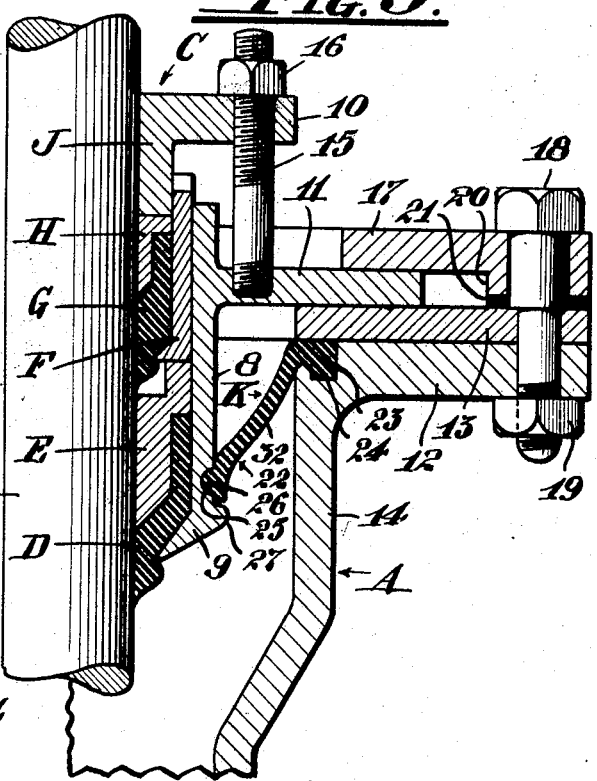
Fig. 3 is an enlarged detail in vertical section as seen on the line 3—3 of Fig. 1 in the direction indicated by the arrows.
Figure 2:
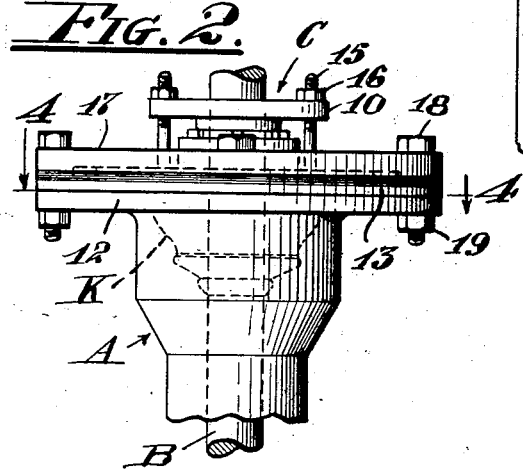
Fig. 2 is a view in side elevation of the structure shown in Fig. 1.
Figure 4:
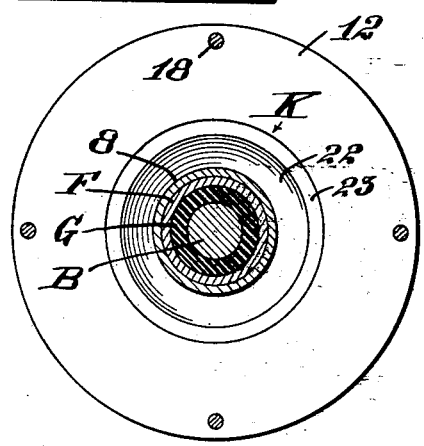
Fig. 4 is a view in horizontal section seen on the line 4—4 of Fig. 2.

A slack 32 is provided in the sleeve 22 as shown in Fig. 3.

It is apparent that the sleeve 22 will serve to seal the joint between the flange 11 and the wearing plate 13 and to effectively prevent the leakage of fluid from the box around the gland.

The operation of the invention is apparent, it being obvious that on lateral movement of the pump rod B during reciprocation thereof, as is occasioned by the arc of travel of a walking beam employed in effecting reciprocation of the rod, the packing gland C will be shifted radially relative to the box A by reason of the slidable connection afforded by the flange 11 between the wearing plate 13 and the cap ring 17; the elastic or pliable sealing element K flexing or expanding during such lateral movement of the gland and serving to seal. By effecting connection between the gland housing 8 and the lower end of the sleeve 22 by the bead 26 on the sleeve engaging the channel 25 on the housing the latter may turn circumferentially relative to the sleeve thus permitting unlimited rotative movement of the gland housing relative to its encompassing box A.

It will be apparent that by equipping the box of an oil well pump with the radially moving packing gland rapid wear of the packing material due to the lateral thrusts of the pump rod will be largely obviated, thus decreasing the shut-downs required to effect renewal of the packing and thereby increasing the production of the well by reason of the prolonged period of pumping operation; it being manifest that the production of the well is temporarily stopped during shut-downs while renewing packing.

While we have shown and described the invention as applied to a pump rod and box of an oil well pump, it is manifest that it may be utilized wherever the provision of a laterally movable packing gland is desirable, and while we have shown a specific embodiment of the invention, we do not limit ourselves to the exact details of construction shown but may employ such changes and modifications as occasion may require coming within the meaning and scope of the appended claims.

We claim:

1. The combination with the head box of a pump tubing of a packing gland having a marginal flange supported by said box in radial and circumferentially slidable movement relative thereto, a wearing ring interposed between said flange and box, means affixed to the box overlying said flange limiting upward movement of the latter relative to said ring, and means for sealing the joint between said flange and wearing ring embodying an annular pliable wall extending between and connected at its margins to said gland and box and having one margin thereof engaged and held in place by said wearing ring.

2. In a pump head, a box having a cylindrical wall, a packing gland housing extending into said box in spaced relation to said wall, a flange on said housing, means on the upper end of said box supporting said flange for radial and circumferential movement, an elastic sleeve in said box encircling said housing having an upper end formed with an outer marginal flange, said box having an inner marginal channel at the upper end thereof in which the flange of said sleeve is seated, and means embodying said housing flange for clamping said sleeve flange in said channel.

3. In a pump head, a box having a cylindrical wall, a packing gland housing extending into said box in spaced relation to said wall, a flange on said housing, means on the upper end of said box supporting said flange for radial and circumferential movement, an elastic sleeve in said box encircling said housing having an upper end formed with an outer marginal flange, said box having an inner marginal channel at the upper end thereof in which the flange of said sleeve is seated, and means embodying said housing flange for clamping said sleeve flange in said channel; said sleeve being formed at its lower end with an inner marginal portion encompassing and engaging a portion of said packing gland housing.

4. In a pump head, a box having a cylindrical wall, a packing gland housing extending into said box in spaced relation to said wall, a flange on said housing, means on the upper end of said box supporting said flange for radial and circumferential movement, an elastic sleeve in said box encircling said housing having an upper end formed with an outer marginal flange, said box having an inner marginal channel at the upper end thereof in which the flange of said sleeve is seated, and means embodying said housing flange for clamping said sleeve flange in said channel; said packing gland housing being formed with a circumferential channel, and an internal bead on the lower end portion of said sleeve engaged in said channel.

TANNER E. BOYER.
LESTER P. STOCKMAN.